United States Patent

Doujak

[11] Patent Number: 6,151,879
[45] Date of Patent: Nov. 28, 2000

[54] WIRE FILAMENT, ESPECIALLY FOR REINFORCING RUBBER OF PLASTIC ITEMS, PROCESS FOR ITS PRODUCTION AND DEVICE FOR IMPLEMENTING THE PROCESS

[75] Inventor: Siegfried Doujak, Merzig, Germany

[73] Assignee: Drahtcord Saar GmbH & Co. KG, Merzig, Germany

[21] Appl. No.: 09/043,504
[22] PCT Filed: Sep. 4, 1996
[86] PCT No.: PCT/EP96/03885
  § 371 Date: May 15, 1998
  § 102(e) Date: May 15, 1998
[87] PCT Pub. No.: WO97/12092
  PCT Pub. Date: Apr. 3, 1997

[30] Foreign Application Priority Data

Sep. 25, 1995 [DE] Germany ............................ 195 35 595

[51] Int. Cl.[7] .................................................. D01H 13/26
[52] U.S. Cl. .................................. 57/311; 57/284; 57/311; 57/1 UN
[58] Field of Search .............................. 57/902, 284, 285, 57/289, 311, 1 UN

[56] References Cited

U.S. PATENT DOCUMENTS

| | | | |
|---|---|---|---|
| 4,246,750 | 1/1981 | Norris et al. ............................... | 57/293 |
| 5,295,346 | 3/1994 | Bundo et al. .............................. | 57/902 |
| 5,487,262 | 1/1996 | De Waegenaere et al. ........... | 57/58.65 |
| 5,512,380 | 4/1996 | De Vos et al. .......................... | 428/592 |
| 5,606,852 | 3/1997 | Yanagisawa .............................. | 57/902 |
| 5,687,557 | 11/1997 | DeVos et al. ............................ | 57/902 |
| 5,878,594 | 3/1999 | DeVos et al. ............................ | 57/902 |

FOREIGN PATENT DOCUMENTS

| | | |
|---|---|---|
| 0143767 | 6/1985 | European Pat. Off. . |
| 0627521 | 12/1994 | European Pat. Off. . |
| 0635597 | 1/1995 | European Pat. Off. . |
| 1159818 | 12/1963 | Germany . |
| 4409182 | 9/1995 | Germany . |
| 2269885 | 11/1990 | Japan . |

*Primary Examiner*—William Stryjewski
*Attorney, Agent, or Firm*—Stevens, Davis, Miller & Mosher, LLP

[57] ABSTRACT

For reinforcing rubber or plastics articles, particularly pneumatic tires, a wire filament is proposed which is spirally shaped and exhibits no elastic residual torsional stresses. A wire filament 8 according to the invention is produced by twisting drawn straight wire filaments 2 into the range of plastic deformation with subsequent return-twisting, at least two wire filaments being brought together and combined prior to return-twisting. Preferably at least two wire filaments 2 are brought together by means of a perforated disk 30, twisted about each other and plastically deformed in a false twister 20 and subsequently return-twisted in a further false twister 40.

14 Claims, 2 Drawing Sheets

WIRE FILAMENT, ESPECIALLY FOR REINFORCING RUBBER OF PLASTIC ITEMS, PROCESS FOR ITS PRODUCTION AND DEVICE FOR IMPLEMENTING THE PROCESS

FIELD OF THE INVENTION

The invention relates to a wire filament, particularly for reinforcing rubber or plastic articles, a method of production thereof as well as to a device for implementing the method.

BACKGROUND OF THE INVENTION

Wire filaments of the for reinforcing rubber or plastic articles are known. These are used in particular to produce steel cords which are employed as inserts in pneumatic tires for motor vehicles to improve their ride, dynamics and stability as well as to extend their useful life.

Prior to wire filaments being combined and further processed into steel cords they are pretreated and preshaped since as drawn filaments, in the absence of suitable preshaping, they have a fatigue strength which is too low and, in addition, tend to wander out of the tires when straight. In preatreatment, care needs to be taken that the wire filaments do not suffer from the treatment. Particularly when being shaped via gearwheels and the like the high-strength wire filaments receive local pressure points which make them unsuitable for cyclic loading, since such local deformities are the starting points for fatigue fracture occuring.

From DE-AS 1 159 818 a method of producing elastic wire ropes is known, according to which for producing elastic wire ropes of low tension and free of twist in production the wires used in configuring the wire rope are twisted into the range of permanent deformation and then return twisted by twice the range of the windings made up to the return limit. The return limit in this sense is a constant maximum number of twists which a given wire is capable of returning after twisting. Twists exceeding this return limit are not returned, but instead are retained as permanent deformations.

From DE 39 14 330 C2 a method of producing a wire bundle or rope is known in which for stranding the wires they are placed and/or twisted about each other and the resulting strands further twisted together in their direction of twist by means of an overtwist means. By further twisting the strand the latter is twisted past its range of elastic deformation into the range of plastic deformation. To reduce the problems associated with the differing residual torsions of strands produced in such a way, the strand receives downstream of the overtwisting device a low constant tensile stress.

SUMMARY OF THE INVENTION

The invention is thus based on the object of defining a wire filament which possesses a good fatigue strength and can be well anchored in rubbers or plastics.

A further object of the invention involves proposing a method of producing such wire filaments which is simply and cost-effectively implementable.

Furthermore, it is the object of the invention to provide a device for implementing such a method which is configured simple and variable and integratable in the production line of a steel cord.

To achieve the object according to the invention a wire filament, particularly for reinforcing rubber or plastics articles, is proposed which is spirally shaped and exhibits no elastic residual torsional stresses. Due to configuring the wire filament according to the invention with a spiral shape, which may be a left-handed or right-handed, it can be anchored particularly well in rubbers or plastics. This proves to be particularly of advantage when the wire filament is employed in reinforcing tires, since a wire filament according to the invention is then under loading unable to more or less simply work itself out of the tire. This advantage also translates to steel cords produced of such wire filaments for reinforcing pneumatic tires. Since the wire filament according to the invention exhibits no residual torsional stresses it permits further processing particularly well and simple, which especially during incorporation in the tire during the vulcanization process is of advantage. Also no forces and torques detrimenting the ride and dynamics of the tire originate from the wire filament worked into the tire.

As regards the further achievement of the object forming the basis of the invention a method of producing wire filaments is proposed in which at least two individual wire filaments are twisted in a false twister and plastically deformed and counter-twisted about each other in a direction opposite to the twisting direction of the first false twister in a further false twister, the at least two wire filaments being twisted in common and about each other in at least the further false twister.

In accordance with the invention the plastic deformation of the wire filaments into spirally-shaped filaments is thus achieved by a treatment with false twisters, the wire filaments being twisted in common and about each other at least in the last false twister. Due to this treatment according to the invention the wire filaments receive the desired spiral shape without being damaged and/or deformed locally as may be the case, for instance, in gearwheel shaping. Accordingly, the fatigue properties of the wire filaments are not detrimented by the nature of the production according to the invention. By turning and twisting the wire filaments adapted to each other in one or more false twisters and in a further false twister the elastic residual torsional stresses are depleted.

In one advantageous aspect of the invention the method comprises the following steps:

A1: at least two single wire filaments are uncoiled from reels,
B1: the wire filaments are each twisted in a false twister and plastically deformed,
C1: the wire filaments are combined in parallel and
D1: the one twisted about the other in a further false twister in a direction of twist opposite to that of the first false twister.

In another advantageous aspect of the invention the method of producing wire filaments involves the following steps:

A2: at least two single wire filaments are uncoiled from reels,
B2: the wire filaments are combined in parallel and
C2: twisted about each in a false twister and plastically deformed,
D2: in a further false twister the wire filaments are twisted about each other in a direction of twist opposite to that of the first false twister.

In a further achievement of the object according to the invention a device for implementing a method according to the invention for the production of wire filaments is proposed which comprises at least one false twister for twisting and plastically deforming wire filaments uncoiled from reels, a device for bringing together individual wire filaments before or after at least the one false twister and a further false twister for return-twisting the wire filaments previously twisted and plastically deformed.

One device according to the invention for implementing a method according to the invention for producing wire filaments can be composed of known individual elements by particularly simple and cost-effective means. For this purpose the device according to the invention is particularly suitable for integration in an already existing steel cord production line. The wire filaments produced by means of the device according to the invention with application of the method according to the invention can thus be further processed into steel cords, for instance, directly following treatment by the method according to the invention. On the other hand they may also be coiled on reels for storage and/or for transportation.

BRIEF DESCRIPTION OF THE DRAWINGS

The invention will now be explained in more detail on the basis of two example embodiments illustrated in the drawings in which.

DETAILED DESCRIPTION OF THE PREFERRED EMBODIMENTS

Figure 1:
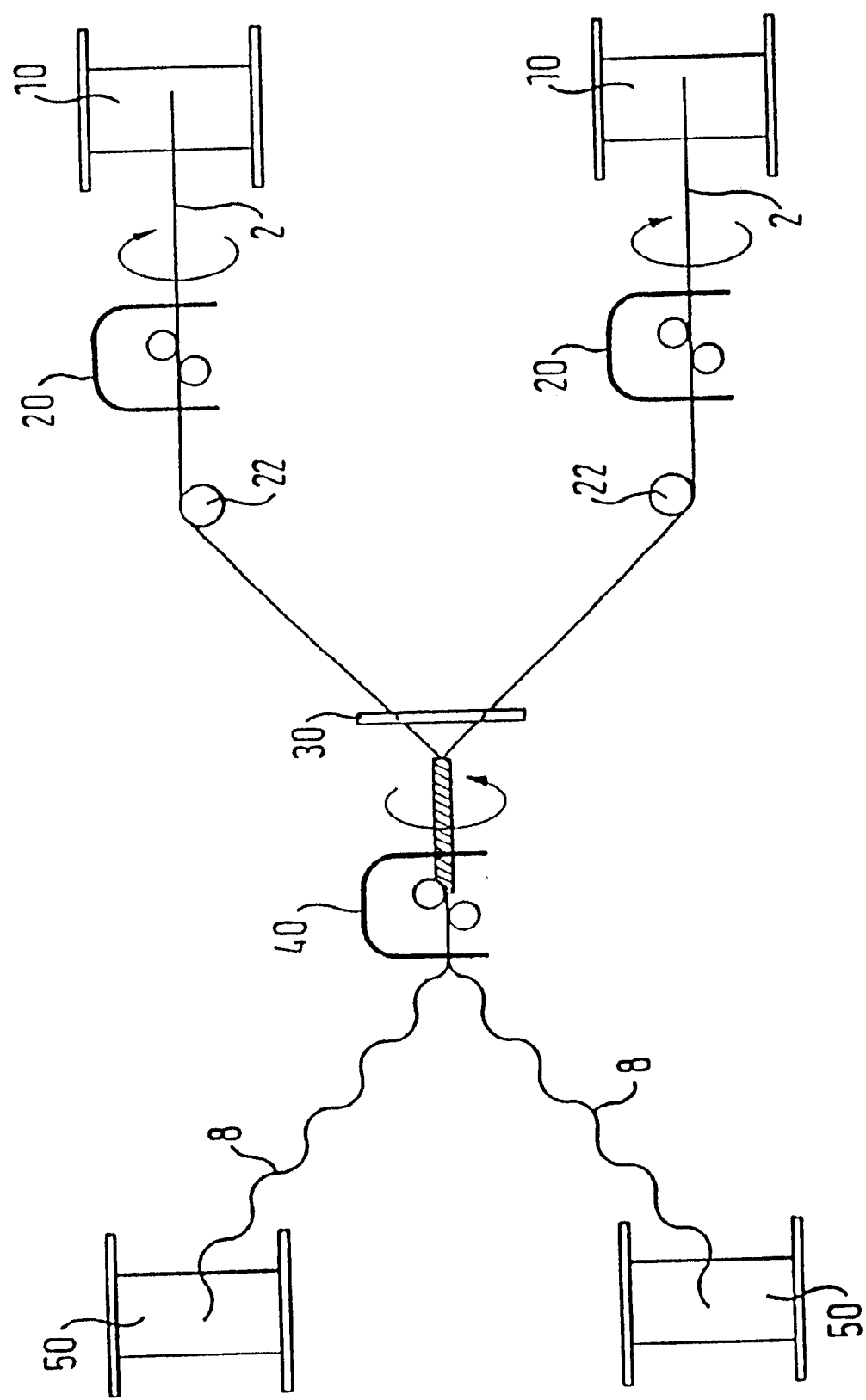
FIG. 1 is a schematic illustration of a first example embodiment of a device according to the invention for implementing a first method according to the invention for producing wire filaments.

FIG. 1 is a schematic illustration of a first example embodiment of a device according to the invention for implementing a first method according to the invention for producing wire filaments. The device illustrated in FIG. 1 comprises two reels 10 on which individual wire filaments 2 are coiled. In addition, the device according to the invention comprises two false twisters 20 each arranged downstream of the reels 10, deflection elements 22 arranged downstream of the false twisters 20, a perforated disk 30 serving as the device for bringing the wire filaments together, a further false twister 40 arranged downstream of the perforated disk 30, as well as two coiling reels 50.

For producing the wire filaments in accordance with a first method of the invention which is implementable by means of the device illustrated in FIG. 1 two individual wire filaments 2 are uncoiled from the two reels 10, this being done in the usual and known way by means of an uncoiler (not shown). Each of the two wire filaments 2 pass through a false twister 20 in which they are twisted about themselves, i.e. into the range of plastic deformation. In the case of the illustrated example the twisting of the wire filaments 2 is clockwise, i.e. right-handed.

On leaving the false twister 20 the plastically deformed wire filaments 2 are fed via deflection elements 22 (for example deflection sheaves) to a perforated disk 30 by means of which the two wire filaments are brought together and combined. The combined wire filaments are then fed to the further false twister 40 in which they are twisted about each other in the direction opposite to that of the first false twister 20 and thus return-twisted. In the case of the example illustrated in FIG. 1 the false twister 40 turns counter-clockwise, i.e. left-handedly. At the output of the further false twister 40 the originally straight wire filaments 2 now exist as spiral wire filaments 8 which due to the sequence of twisting and return-twisting adapted to each other exibit no elastic residual torsional stresses.

The wire filaments 8 obtained by the method according to the invention may be further processed directly in a corresponding production line into steel cords, for instance, for reinforcing pneumatic tyres. They may also be coiled for storage and/or transportation on coiling reels 50, as illustrated by the example in FIG. 1.

Figure 2:
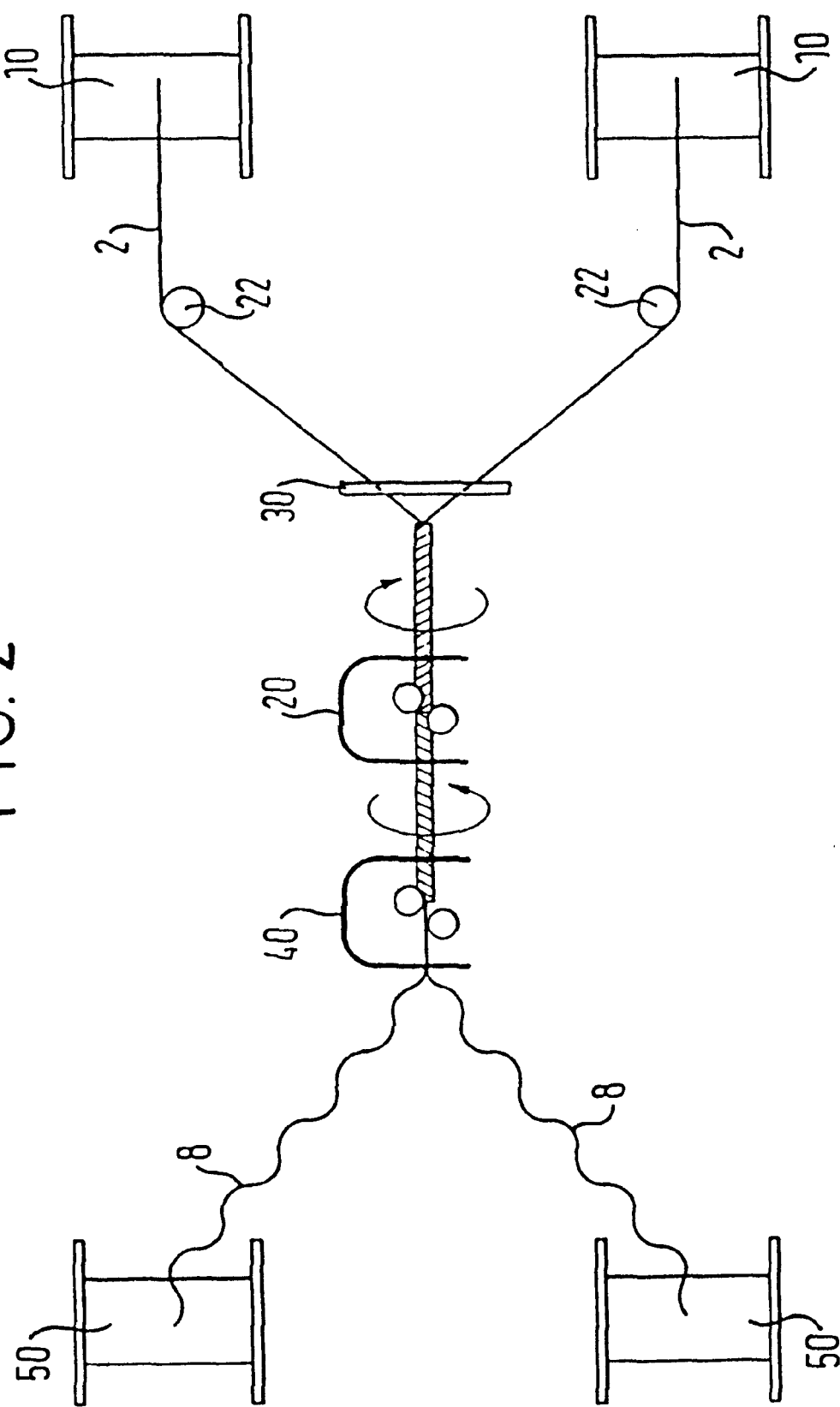
FIG. 2 is a schematic illustration of a second example embodiment of a device according to the invention for implementing a second method according to the invention for producing wire filaments.

FIG. 2 shows a further example embodiment of a device according to the invention for the production of wire filaments. This device shown schematically comprises the same elements as the device shown in FIG. 1, i.e. two reels 10 with wire filaments 2 coiled thereon, deflection elements 22, a perforated disk 30, a first false twister 20, a second false twister 40 as well as two coiling reels 50.

Unlike the device according to the invention as illustrated in FIG. 1 for the production of wire filaments in the example embodiment of FIG. 2 only a single first false twister 20 is provided arranged upstream of the perforated disk 30. For producing spiral wire filaments according to the invention having no elastic residual torsional stresses two wire filaments 2 are now uncoiled from the reels 10 according to the invention and fed by means of deflection elements 22 to the perforated disk 30 by means of which they are brought together and combined. These wire filaments 2 thus combined are fed to the first false twister 20 in which they are twisted around each other and plastically deformed. In the illustrated example twisting is done clockwise, i.e. right-handedly.

Directly arranged downstream of the first false twister 20 is the further false twister 40 to which the wire filaments twisted about each other and plastically deformed are fed directly. In the further false twister 40 these are twisted about each other opposite to the twisting direction of the first false twister 20 and are thus return-twisted. In the illustrated example the further false twister 40 twists in the direction opposing the clockwise direction, i.e. left-handedly. Downstream of the false twister 40 two spirally shaped wire filaments 8 exist, as illustrated in the example in FIG. 1, which exhibit no elastic residual torsional stresses. These are coiled, as shown, on the two coiling reels 50.

Due to common twisting of wire filaments according to the invention in at least the last false twister of the production method depleting residual torsional stresses and assuring a permanent spiral deformation is achieved in a particularly simple and favorable manner. To achieve best results, especially the twists exceeding the return limit of the wire filaments need to be compensated by subsequent twisting. This is achieved by suitably adapting the one or first false twister(s) 20 to the further false twister 40.

The hand direction of the wire filaments forming a spiral is determined by the direction of twist of the last false twister, i.e. by twisting up. Accordingly, the wire filaments produced according to the methods illustrated in the Figs. exhibit a left-hand spiral shape.

The shape of the spirals of the wire filaments may be determined by further parameters such as, for instance, the rate of uncoiling and the rotatative speed of the false twisters. In addition, the spiral shape is also influenced by the number of parallel wire filaments in forming the spirals since, of course, more than two wire filaments may be brought together and twisted about each other.

What is claimed is:

1. A method of producing a spirally-shaped wire filament for reinforcing rubber or plastic articles, in which at least two individual wire filaments are twisted together and plastically deformed and then separated from each other, said method comprising the following steps:

A1: uncoiling at least two single wire filaments (2) from reels (10),

B1: twisting and plastically deforming each of said wire filaments (2) in first false twisters (20), C1: combining said twisted and plastically deformed wire filaments (2) in parallel, D1: intertwining said twisted and plastically deformed wire filaments (2) in a second false twister (40) in a direction of twist opposite to the direction of twist of said first false twisters (20) and means for separating said return-twisted wire filaments (2) to provide at least two single-shaped wire filaments (8) and, E1: separating said twisted and plastically deformed wire filaments (2), after said intertwining in said second false twister (40), to provide at least two single spirally-shaped wire filaments (8).

2. The method as set forth in claim 1 wherein said wire filaments (2) are brought together and combined by means of a perforated disk (30).

3. The method as set forth in claim 1, wherein said spiral-shaped wire filaments (8) are further processed directly.

4. The method as set forth in claim 1, wherein said spiral-shaped wire filaments (8) are coiled on coiling reels (50).

5. A device for producing a spirally-shaped wire filament for reinforcing rubber or plastic articles, in which at least two individual wire filaments are twisted together and plastically deformed, comprising:

at least two first false twisters (20) for twisting and plastically deforming at least two wire filaments (2) uncoiled from reels (10), a device (30) for grouping together individual said wire filaments (2) in parallel downstream of said at least two first false twisters (20), and a further false twister (40) for return-twisting the wire filaments (2) previously twisted and plastically deformed in a direction of twist opposite to the direction of twist of said first false twisters (20).

6. The device as set forth in claim 5, wherein as the device (30) for bringing together individual wire filaments a perforated disk (30) is provided.

7. The device of claim 5, further comprising means for separating said return-twisted wire filaments (2) to provide at least two single spirally-shaped wire filaments (8).

8. A method of producing a spirally-shaped wire filament for reinforcing rubber or plastic articles, in which at least two individual wire filaments are twisted together and plastically deformed and then separated from each other, said method comprising the following steps:

A2: uncoiling at least two single wire filaments (2) from reels (10),

B2: combining said wire filaments (2) in parallel,

C2: intertwining and plastically deforming said wire filaments (2) in a first false twister (20), D2: intertwining said intertwined and plastically deformed wire filaments (2) in a second false twister (40) in a direction of twist opposite to the direction of twist of said first false twister (20), and E2: separating said intertwined and plastically deformed wire filaments (2), after said intertwining in said second false twister (40), to provide at least two single spirally-shaped wire filaments (8).

9. The method as set forth in claim 8, wherein said wire filaments (2) are brought together and combined by means of a perforated disk (30).

10. The method as set forth in claim 8, wherein said spiral-shaped wire filaments (8) are further processed directly.

11. The method as set forth in claim 8, wherein said spiral-shaped wire filaments (8) are coiled on coiling reels (50).

12. A device for producing a spirally-shaped wire filament for reinforcing rubber or plastic articles, in which at least two individual wire filaments are twisted together and plastically deformed, comprising:

at least one first false twister (20) for twisting and plastically deforming said wire filaments (2) uncoiled from reels (10), a device (30) for grouping together individual said wire filaments (2) in parallel upstream of said at least one first false twister (20), a further false twister (40) for return-twisting the wire filaments previously twisted and plastically deformed in a direction of twist opposite to the direction of twist of said first false twister (20) and means for separating said return-twisted wiere filament (2) to provide at least two single-shaped wire filaments (8).

13. The device as set forth in claim 12, wherein as the device (30) for bringing together individual wire filaments a perforated disk (30) is provided.

14. The device as set forth in claim 12, wherein said means for separating comprise winding reels.

* * * * *